(12) United States Patent
Elbaz et al.

(10) Patent No.: US 11,083,029 B2
(45) Date of Patent: *Aug. 3, 2021

(54) SOFTWARE DEMARCATION IN EDGE COMPUTING ENVIRONMENT

(71) Applicant: AT&T Intellectual Property I, L.P., Atlanta, GA (US)

(72) Inventors: Igal Elbaz, Dallas, TX (US); Brian Freeman, Farmingdale, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,677

(22) Filed: May 25, 2020

(65) Prior Publication Data

US 2020/0288516 A1    Sep. 10, 2020

Related U.S. Application Data

(63) Continuation of application No. 16/504,560, filed on Jul. 8, 2019, now Pat. No. 10,667,308, which is a
(Continued)

(51) Int. Cl.
*H04W 76/12* (2018.01)
*G06F 9/455* (2018.01)
(Continued)

(52) U.S. Cl.
CPC ........ *H04W 76/12* (2018.02); *G06F 9/45558* (2013.01); *H04L 41/042* (2013.01);
(Continued)

(58) Field of Classification Search
CPC .... H04W 76/12; H04W 84/042; H04L 41/18; H04L 41/042; H04L 41/5054;
(Continued)

(56) References Cited

U.S. PATENT DOCUMENTS 5,717,747 A    2/1998  Boyle et al.
6,377,572 B1   4/2002  Dolan et al.
(Continued)

FOREIGN PATENT DOCUMENTS

WO    2014075312 A1    5/2014

*Primary Examiner* — Diane D Mizrahi

(57) ABSTRACT

Methods, computer-readable media, and devices for instantiating a service provider application on a customer premises-based device are disclosed. For example, a processing system of a telecommunication service provider network having at least one processor may establish a first tunnel between the processing system and a virtual machine monitor of a customer premises-based device and send a first instruction to the virtual machine monitor via the first tunnel to instantiate a first service provider application on the customer premises-based device. The processing system may further establish a second tunnel between the processing system and the first service provider application and send a second instruction to the first service provider application via the second tunnel to configure the first service provider application to operate in a service function chain.

20 Claims, 4 Drawing Sheets

Related U.S. Application Data continuation of application No. 15/980,898, filed on May 16, 2018, now Pat. No. 10,349,454.

(51) Int. Cl.
  *H04L 29/06* (2006.01)
  *H04L 12/24* (2006.01)
  *H04L 29/08* (2006.01)
  *H04W 84/04* (2009.01)

(52) U.S. Cl.
  CPC .............. *H04L 41/08* (2013.01); *H04L 41/18* (2013.01); *H04L 41/5054* (2013.01); *H04L 63/029* (2013.01); *G06F 2009/45591* (2013.01); *G06F 2009/45595* (2013.01); *H04L 67/20* (2013.01); *H04W 84/042* (2013.01)

(58) Field of Classification Search
  CPC ....... H04L 63/029; H04L 41/08; H04L 67/20; G06F 9/45558; G06F 2009/45591; G06F 2009/45595; H01L 27/11582; H01L 27/11519; H01L 23/5226; H01L 27/11556; H01L 23/528; H01L 27/11565; H01L 27/11575

See application file for complete search history.

(56) References Cited

U.S. PATENT DOCUMENTS

| | | |
|---|---|---|
| 6,961,335 B1 | 11/2005 | Millet et al. |
| 7,474,742 B2 | 1/2009 | Cook |
| 8,386,465 B2 | 2/2013 | Ansari et al. |
| 8,422,397 B2 | 4/2013 | Ansari et al. |
| 8,484,712 B2 | 7/2013 | Ganem |
| 8,532,121 B2 | 9/2013 | Bennett |
| 8,681,611 B2 | 3/2014 | Delregno et al. |
| 8,971,341 B2 | 3/2015 | Ansari et al. |
| 9,173,117 B2 | 10/2015 | Haddad et al. |
| 9,654,350 B2 | 5/2017 | Davari et al. |
| 9,906,380 B2 | 2/2018 | Kusano |
| 10,349,454 B1 | 7/2019 | Elbaz et al. |
| 10,667,308 B2 * | 5/2020 | Elbaz ............... H04L 41/08 |
| 2015/0333794 A1 | 11/2015 | Casey et al. |
| 2016/0182458 A1 | 6/2016 | Shatzkamer et al. |
| 2016/0301593 A1 | 10/2016 | Blair et al. |
| 2016/0329965 A1 | 11/2016 | Cook et al. |
| 2017/0155724 A1 | 6/2017 | Haddad et al. |
| 2017/0237710 A1 | 8/2017 | Mayya et al. |
| 2018/0074816 A1 | 3/2018 | Moss et al. |
| 2018/0077739 A1 | 3/2018 | Moss et al. |
| 2019/0158353 A1 | 5/2019 | Johnson et al. |

* cited by examiner

SOFTWARE DEMARCATION IN EDGE COMPUTING ENVIRONMENT

This application is a continuation of U.S. patent application Ser. No. 16/504,560, filed Jul. 8, 2019, now U.S. Pat. No. 10,667,308, which is a continuation of U.S. patent application Ser. No. 15/980,898, filed May 16, 2018, now U.S. Pat. No. 10,349,454, all of which are herein incorporated by reference in its entirety.

The present disclosure relates generally to telecommunication network and customer edge interfaces, and more particularly to methods, non-transitory computer-readable media, and devices for instantiating a service provider application on a customer premises-based device.

BACKGROUND

A demarcation point (also known as "demarc") for a telecommunication network is based on physical assets. The demarc has traditionally been the point at which the service provider network connects to customer premises wiring for telephony and/or other telecommunication services. For example, a demarc may comprise a physical device, e.g., a junction box and/or network interface device (NID) installed on the outside or just inside a dwelling or other structures. Demarc extensions may also be provided where the telecommunication network service provider may install service provider-owned wiring to another point in the structure, such as a media room. However, hardware-based demarcation may be inflexible in an edge computing environment in which software overlays and various software tools reside.

SUMMARY

In one example, the present disclosure describes a device, computer-readable medium and method for instantiating a service provider application on a customer premises-based device. For instance, in one example, a processing system of a telecommunication service provider network having at least one processor may establish a first tunnel between the processing system and a virtual machine monitor of a customer premises-based device and send a first instruction to the virtual machine monitor via the first tunnel to instantiate a first service provider application on the customer premises-based device. The processing system may further establish a second tunnel between the processing system and the first service provider application and send a second instruction to the first service provider application via the second tunnel to configure the first service provider application to operate in a service function chain.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure provide a software demarcation that is independent of hardware demarcation. In a private cloud, for example, a telecommunication network service provider may not own the hardware that serves as the physical demarc in current deployments. In accordance with the present disclosure, a software demarc is established at the point where a customer chooses to run overlay software in a private cloud or other virtual networks. In one example, the point where the customer chooses to run telecommunication network service provider software, such as flow logic tools or other software tools, can be the demarc/starting point for overlay networks, applications, etc. Such a starting point or demarc can be downstream from the hardware (which may not be owned by the telecommunication network service provider) and closer to the customer's data, decision-making logic, and so forth. The software demarc may also represent the new edge in a virtual network. In this way, the edge becomes optimizable based on software irrespective of the demarc of the physical infrastructure.

Examples of the present disclosure also provide operations interfaces for the applications that would be managed and maintained by the telecommunication network service provider on the customer hardware. Reaching the service provider applications on the customer hardware via a tunnel or other secure encapsulations creates an environment where server processes run on the customer premises-based device, but are supported remotely by the telecommunication network service provider and can be moved to other devices, mirrored to other devices, and upgraded with new capabilities independently or as the device hardware is upgraded. These and other aspects of the present disclosure are described in greater detail below in connection with the examples of FIGS. 1-4.

Figure 1:
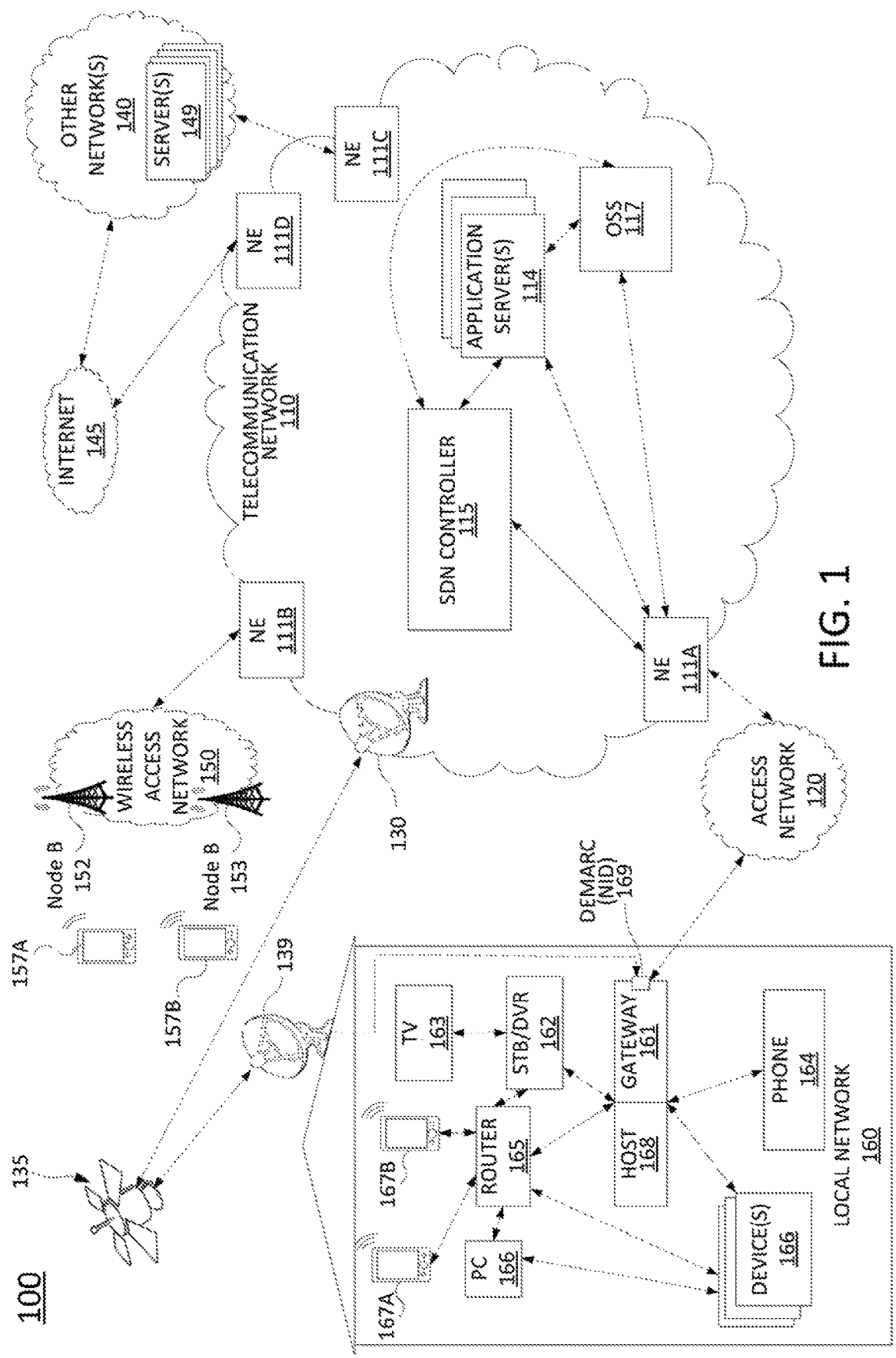
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and local network devices such as gateway 161, set-top boxes (STB) 162, television (TV) 163, phone 164, router 165, personal computer (PC) 166, and so forth, with one another and with various other devices via a telecommunication network 110 (e.g., a telecommunication service provider network), a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a telecommunication network 110. In one example, telecommunication network 110 may combine core network components of a cellular network with components of a triple play service network; where triple-play services include telephone services, Internet services and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the telecommunication network 110 with other networks 140, Internet 145, wireless access network 150, access network 120, and so forth.

As illustrated in FIG. 1, telecommunication network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of telecommunication network 110 may receive and store third-party information relating to subscribers. In one example, application servers 114 may represent a distributed file system.

With respect to television service provider functions, application servers 114 may comprise television servers for the delivery of television content, e.g., a broadcast server, a cable head-end, interactive TV/video-on-demand (VOD) server(s), advertising/television commercial servers, and so forth. For example, telecommunication network 110 may comprise a video super hub office, a video hub office and/or a service office/central office.

In one example, one or more of application servers 114 receive, store, and/or provide service provider applications (e.g., executable code and/or other data to support a service provider application in accordance with the present disclosure), information relating to service function chains (SFCs) for various subscribers, for various network service provider purposes, and so forth. For instance, application servers 114 may store SFC labels, label assignments to particular SFCs, the component applications/services within various SFCs, the quality of service (QoS)/priority assigned to various SFCs, and so forth. In one example, each of application servers 114 may comprise a computing system or server, such as computing system 400 depicted in FIG. 4, and may be configured to provide one or more operations or functions for instantiating a service provider application on a customer premises-based device, as described herein. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. It should also be noted that the foregoing are only several examples of the types of relevant application servers 114 that may be included in telecommunication network 110 in connection with examples of the present disclosure for instantiating a service provider application on a customer premises-based device, as described herein.

In one example, any one or more of the components of telecommunication network 110 may comprise a network function virtualization infrastructure (NFVI), e.g., software-defined networking (SDN) host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, any one or more of application servers 114 may also represent a NFVI. In addition, when comprised of various NFVIs, the telecommunication network 110 may be expanded (or contracted) to include more or less components than the state of telecommunication network 110 that is illustrated in FIG. 1. In this regard, the telecommunication network 110 may also include a SDN controller 115 that is responsible for instantiating, configuring, managing, and releasing VNFs. For example, in a SDN architecture, SDN controller 115 may instantiate VNFs on shared hardware, e.g., NFVI/host devices/SDN nodes, which may be physically located in various places. In one example, the configuring, releasing, and reconfiguring of SDN nodes is controlled by the SDN controller 115, which may store configuration codes, e.g., computer/processor-executable programs, instructions, or the like for various functions which can be loaded onto an SDN node. In another example, the SDN controller 115 may instruct, or request an SDN node to retrieve appropriate configuration codes from a network-based repository, e.g., a storage device, to relieve the SDN controller from having to store and transfer configuration codes for various functions to the SDN nodes. Accordingly, the SDN controller 115 may be connected directly or indirectly to any one or more network elements of telecommunication network 110, and of the network 100 in general. Due to the relatively large number of connections available between SDN controller 115 and other network elements, various links to the SON/SDN controller 115 are omitted from illustration in FIG. 1.

In one example, telecommunication network 110 may further include operations support systems (OSS) 117. An OSS refers to systems that provide operations support, such as provisioning and maintenance functions, inventory functions, and so forth for telecommunications network infrastructure. For instance, OSS 117 may include a subscriber database, a subscriber provisioning system, a network equipment inventory system, etc. In accordance with the present disclosure, OSS 117 may store various information as described above in connection with application servers 114, such as SFC labels and assignments to particular SFCs, the component applications/services within various SFCs, the quality of service (QoS)/priority assigned to various SFCs, and so forth. Due to the relatively large number of connections available between OSS 117 and other network elements, various links to the OSS 117 are omitted from illustration in FIG. 1.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of telecommunication network 110 may provide a cable television service, an IPTV service, or any other types of television service to subscribers via access network 120. In this regard, access network 120 may include a node, e.g., a mini-fiber node (MFN), a video-ready access device (VRAD), or the like. However, in another example, such a node may be omitted, e.g., for fiber-to-the-premises (FTTP) installations. Access network 120 may also transmit and receive communications between local network 160 and telecommunication network 110 relating to voice telephone calls, communications with servers 149 via the Internet 145 and/or other networks 140, and so forth.

Alternatively, or in addition, the network 100 may provide television services to local network 160 via a satellite broadcast. For instance, ground station 130 may receive television content from television servers 114 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the telecommunication network 110. In another example, satellite 135 may be controlled and/or operated by a different entity and may carry television broadcast signals (or other downlink and/or uplink communications) on behalf of the telecommunication network 110 and/or the local network 160.

In one example, local network 160 may include a gateway 161, which receives data/communications associated with different types of media, e.g., television, phone, and Internet, and separates these communications for the appropriate devices. The data/communications may be received via access network 120 and/or via satellite receiver 139, for instance. In one example, the gateway 161 may comprise an optical network terminal (ONT), e.g., where the access network 120 comprises a fiber optic access network with a fiber to the home (FTTH)/fiber to the premises (FTTP) deployment to local network 160. In one example, all communications into and out of the local network 160 may pass through a physical demarcation point (demarc) 169, also referred to as a network interface device (NID). However, with respect to satellite-based communications, in one example, the physical demarc may comprise the satellite receiver 139. In other words, the satellite receiver 139 is owned and operated, and is the responsibility of the subscriber to maintain.

In one example, television data is forwarded to set-top boxes (STB)/digital video recorders (DVR) 162 to be decoded, recorded, and/or forwarded to television (TV) 163 for presentation. Similarly, telephone data is sent to and received from phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163, e.g., where the television is a smart TV. In one example, router 165 may comprise a wired Ethernet router and/or an Institute for Electrical and Electronics Engineers (IEEE) 802.11 (Wi-Fi) router, and may communicate with respective devices in local network 160 via wired and/or wireless connections.

In accordance with the present disclosure the network 160 may further include a host 168 attached, coupled to, or integrated with gateway 161. In one example, the host 168 may comprise a computing system or server, such as computing system 400 depicted in FIG. 4, and may be configured to provide one or more operations or functions in connection with instantiating a service provider application on a customer premises-based device, as described herein. For instance, host 168 may comprise a physical computing device or processing system running a virtual machine monitor (VMM), or hypervisor, that is controllable by one or more devices of telecommunication network 110 to instantiate one or more service provider applications on the host 168, e.g., comprising one or more virtual machines (VMs), containers, or the like. In accordance with the present disclosure, host 168 may also be controllable to instantiate and maintain one or more customer applications on the host 168, e.g., comprising one or more VMs, containers, or the like. For instance, one of the devices 166 may be configured to control customer applications on host 168. Alternatively, or in addition, one or more remote devices controlled by a person or entity associated with local network 160 may remotely configure host 168 to instantiate, maintain, reconfigure, and/or tear down customer applications on host 168.

In one example, local network 160 may represent an enterprise network, e.g., of a business, an educational or medical institution, or the like. Accordingly, in one example, local network 160 may further include devices 166 which may comprise servers deployed in local network 160 hosting various customer applications and related data, such as an inventory system, a contact management system, a call routing system, an interactive voice response (IVR) system, a firewall, a content filter, an intrusion detection system, and so forth.

In accordance with the present disclosure, the service provider applications instantiated on host 168 may be configured into service function chains (SFCs) involving other service provider applications, e.g., on host 168, in telecommunication network 110, e.g., at application severs 114, and/or at servers 149. In addition, the service provider applications instantiated on host 168 may also be configured into SFCs with customer applications on host 168, devices 166, other devices in local network 160, servers 149 in one or more other (remote) networks 140, and so forth. In one example, the SDN controller 115 and the NFVI controllable by the SDN controller 115 (e.g., host 168 in local network 160, application servers 114 in telecommunication network 110, and any NFVI controllable by SDN controller 115 in other networks 140, such as servers 149), may be referred to as a software defined wide area network (SD-WAN). In one example, SFCs may be controlled (e.g., established, maintained, reconfigured, torn down, and so forth) by SDN controller 115 in conjunction with one or more customer-controlled devices, such as one of the devices 166, or the like.

Further details regarding the functions that may be implemented by SDN controller 115, OSS 117, application servers 114, gateway 161, host 168, devices 166, and so on are discussed in greater detail below in connection with the examples of FIGS. 2-4. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth. In still another example, functions that are described herein as being performed by SDN controller 115 and/or OSS 117 may alternatively or additionally be performed by a SFC orchestrator, or the like. In addition, for ease of illustration various intermediate devices, such as gateways, border elements, layer 3 routers, MPLS routers, SFC forwarders, and so forth are omitted from FIG. 1.

Figure 2:
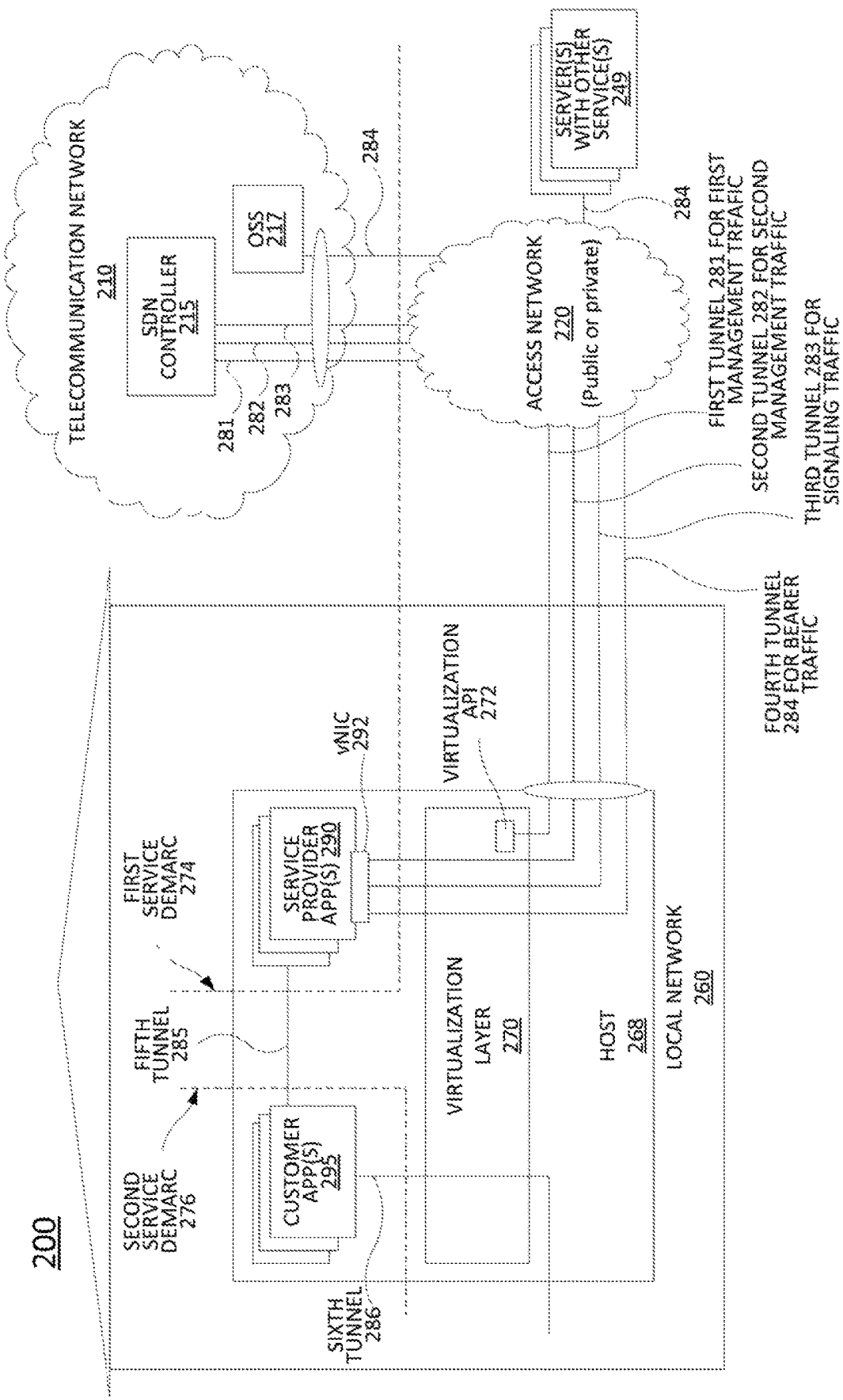
FIG. 2 illustrates an example system for instantiating a service provider application on a customer premises-based device, in accordance with the present disclosure.

FIG. 2 illustrates an example system 200 for instantiating a service provider application on a customer premises-based device, in accordance with the present disclosure. The system 200 comprises several components which are the same as or similar to those illustrated in example of FIG. 1, such as telecommunication network 210 (e.g., a telecommunication service provider network), SDN controller 215, OSS 217, access network 220, local network 260, host 268, and servers 249.

As also shown in FIG. 2, a virtualization layer 270 is illustrated as being running on the host 268. The virtualization layer 270 may comprise, for example, a hypervisor or virtual machine monitor (VMM). In one example, the virtualization layer 270 includes a virtualization application programming interface (API) 272. In accordance with the present disclosure, the virtualization API 272 may be provided for one or more devices of telecommunication network 210 to access and control the virtualization layer 270 on the host 268. In one example, the virtualization API 272 provides a limited set of commands that the devices in telecommunication network 210 may utilize to control the virtualization layer 270. For instance, one or more commands may be provided to allow the instantiation of a new service provider application on the host 268. The one or more commands may specify certain operating parameters, such as an application priority for processor time, a memory allocation, and so forth. In one example, the one or more commands may specify a location (e.g., a uniform resource locator (URL), or other network address identifiers) where an image of the service provider application can be obtained. The image may include instructions, code, and other data for the service provider application to function in accordance with its designated purpose. In one example, the virtualization layer 270 may obtain the service provider application in accordance with the URL. In another example, the service provider application may be stored in a storage portion (e.g., a magnetic drive, solid-state drive, etc.) of the host 268 and accessed by the virtualization layer 270 in response to a command to instantiate the service provider application. Similarly, one or more commands may be provided to allow the decommissioning of a service provider application on the host 268 by one or more devices in the telecommunication network 210.

As illustrated in FIG. 2, a number of service provider applications (apps) 290 may be instantiated and/or running on host device 268 via the virtualization layer 270. The service provider applications 290 may include, for example: forwarding, labeling, web acceleration, intrusion detection, encryption, video processing, blurring, artificial intelligence (AI)/machine learning (ML) applications, content filtering, general web applications, and so on. In one example, each of the service provider applications 290 may comprise a virtual network interface card (vNIC), e.g., vNIC 292. For instance, vNIC 292 may be assigned a media access control (MAC) address and provided to one of service provider applications 290. In one example, the MAC address of vNIC 292 may be valid only within the local network 260. In one example, the MAC address may be assigned from a MAC pool designated for host 268 and/or the local network 260. The one of the service provider applications 290 may then be accessed by directing traffic to the MAC address of vNIC 292. For instance, in the example of FIG. 2, remote devices (external to local network 260) may access the one of service provider applications 290 via the vNIC 292 by addressing traffic to the IP address associated with host 268 (and/or a gateway or other intermediate devices facing access network 220) along with the MAC address of vNIC 292 e.g., in an Ethernet frame encapsulated within the IP packet.

In accordance with the present disclosure, various network tunnels may be utilized for management traffic, signaling traffic, and bearer traffic associated with the service provider applications 290. To illustrate, SDN controller 215 may establish a first tunnel 281 for first management traffic between the SDN controller 215 and the virtualization API 272. The first management traffic may include commands and responses relating to establishing/instantiating service provider applications 290 on host 268 and tearing down the service provider applications 290 as described above. SDN controller 215 may also establish a second tunnel 282 for second management traffic between the SDN controller 215 and one of the service provider applications 290. In one example, the second tunnel 282 for the second management traffic may be between the SDN controller 215 and the vNIC 292 associated with the one of the service provider applications 290. The second management traffic may provide commands, operational data, and/or other information from the SDN controller 215 to configure the one of service provider applications 290 to function in a particular way.

In one example, signaling traffic for the one of the service provider applications 290 may share the second tunnel for the second management traffic 283. However, in another example, a third tunnel 283 may be established for the signaling traffic. As illustrated in FIG. 2, signaling traffic (e.g., via third tunnel 283) may be exchanged between service provider applications 290 and SDN controller 215 and/or OSS 217 in telecommunication network 210. The signaling traffic may relate to routing of bearer traffic, may relate to the requesting and providing of operational records, statistics, and other information from one of the service provider applications 290, such as call detail records (CDRs), and so forth.

Similarly, a fourth tunnel 284 for bearer traffic may be established for the one of the service provider applications 290 via the vNIC 292. In the example of FIG. 2, the bearer traffic may be exchanged between the one of the service provider applications 290 and one or more servers 249 with other services. In particular, the bearer traffic may be tunneled via the access network 220 (which may be operated by a same or a different entity as telecommunication network 210) in a similar manner to the second management traffic (e.g., via second tunnel 282) and the signaling traffic (e.g., via third tunnel 283) for the one of the service provider applications via vNIC 292. It should be noted that in one example, the signaling traffic and bearer traffic may be separately encapsulated for transport via access network 220. However, in another example, signaling traffic and bearer traffic may share a same tunnel/encapsulation and/or a same set of encryption keys. In still another example, the signaling traffic may be exchanged with a device that is not deployed in telecommunication network 210.

As further illustrated in FIG. 2, one or more customer applications 295 may also be instantiated on host 268 via virtualization layer 270. In accordance with the present disclosure, a customer, subscriber, or other persons or entities operating local network 260 may provide and control host 268. In addition, in one example, the virtualization layer 270 may also be provided and controlled by the operator of local network 260. The virtualization API 272 may therefore provide to telecommunication network 210 a limited ability to control virtualization layer 270, e.g., with only a certain set of commands to instantiate and tear down service provider applications 290. In one example, the virtualization API 272 may impose an adherence to limitations on processor utilization, memory utilization, network bandwidth, and so forth that may be set by the operator of local network 260. In this example, the responsibilities of the telecommunication service provider of telecommunication network 210 and the operator of local network 260 may be indicated by a first service demarcation point (demarc) 274. In another example, the operator of local network 260 may provide and control host 268 while the telecommunication service provider of telecommunication network 210 may provide and control the virtualization layer 270. In this example, the responsibilities of the telecommunication service provider of telecommunication network 210 and the operator of local network 260 may be indicated by a second service demarcation point (demarc) 276.

In accordance with the present disclosure, one or more of the service provider applications 290 may be configured to operate in one or more service function chains (SFCs) involving others of the service provider applications 290, services (e.g., applications) deployed on servers 249, customer applications 295, and so forth. In one example, SFCs may be controlled (e.g., established, maintained, reconfigured, torn down, and so forth) by SDN controller 215 and/or by SDN controller 215 in conjunction with host 268 (e.g., the virtualization layer 270 component of host 268), servers 249, and so on. In the example of FIG. 2, an SFC may include a service on one of servers 249, one of the service provider applications 290, one of the customer applications 295. In one example, the SFC may further include additional applications/services, e.g., downstream from one of customer applications 295. The services/applications in the SFC may exchange bearer traffic, e.g., via the fourth tunnel 284 between the one of service provider applications 290 and one or more of servers 249, via a fifth tunnel 285 between one of service provider applications 290 and the one of the customer applications 295, and via a sixth tunnel 286 between the one of customer applications 295 and any additional applications/services in the SFC, and so on.

The fifth tunnel 285 and sixth tunnel 286 may be the same as or similar to the tunnels 281-284. Although the one of service provider applications 290 and the one of customer applications 295 both reside on host 268, the fifth tunnel 285 indicates that the respective applications logically may comprise separate devices which address one another as peers using various network communication protocols. For instance, the one of customer applications 295 may also include a vNIC (not shown) for interfacing with the one of service provider applications 290 via vNIC 292. The sixth tunnel 286 may represent a tunnel between one of customer applications 295 and an additional customer application deployed on another device within local network 260, or an application/service in an external network. In one example, a plurality of tunnels in the SFC may share encryption keys and/or other parameters, such as quality of service (QoS)/priority flags, Multi-Protocol Label Switching (MPLS) labels, SFC identifiers, and so forth.

It should be noted that SFCs may include non-serial or non-linear topologies. For instance, an SFC may have a tree structure with one or more branches, and irregular structure with one or more paths that may lead to a given application/service, and so forth. Thus, in one example, an SFC may split and splice traffic, or route traffic differently depending upon the parameters of the traffic, the time of day, day of the week, network congestion, or other factors. For instance, video and audio channels may be separated from a media stream at a first service/application, processed separately by different customer and/or service provider applications, and then re-mixed by yet another customer and/or service provider application. It should also be noted that in the example of FIG. 2, the servers 249 with other services are illustrated external to telecommunication network 210. However, it should be understood that in other, further, and different examples, the servers 249 may also represent additional components of telecommunication network 210, e.g., NFVI for hosting other service provider applications, other customer applications, applications of different customers, and so forth. In addition, for ease of illustration various intermediate devices, such as gateways, border elements, layer 3 routers, MPLS routers, SFC forwarders, and so forth are omitted from FIG. 2. Thus, these and other modifications are all contemplated within the scope of the present disclosure.

Figure 3:
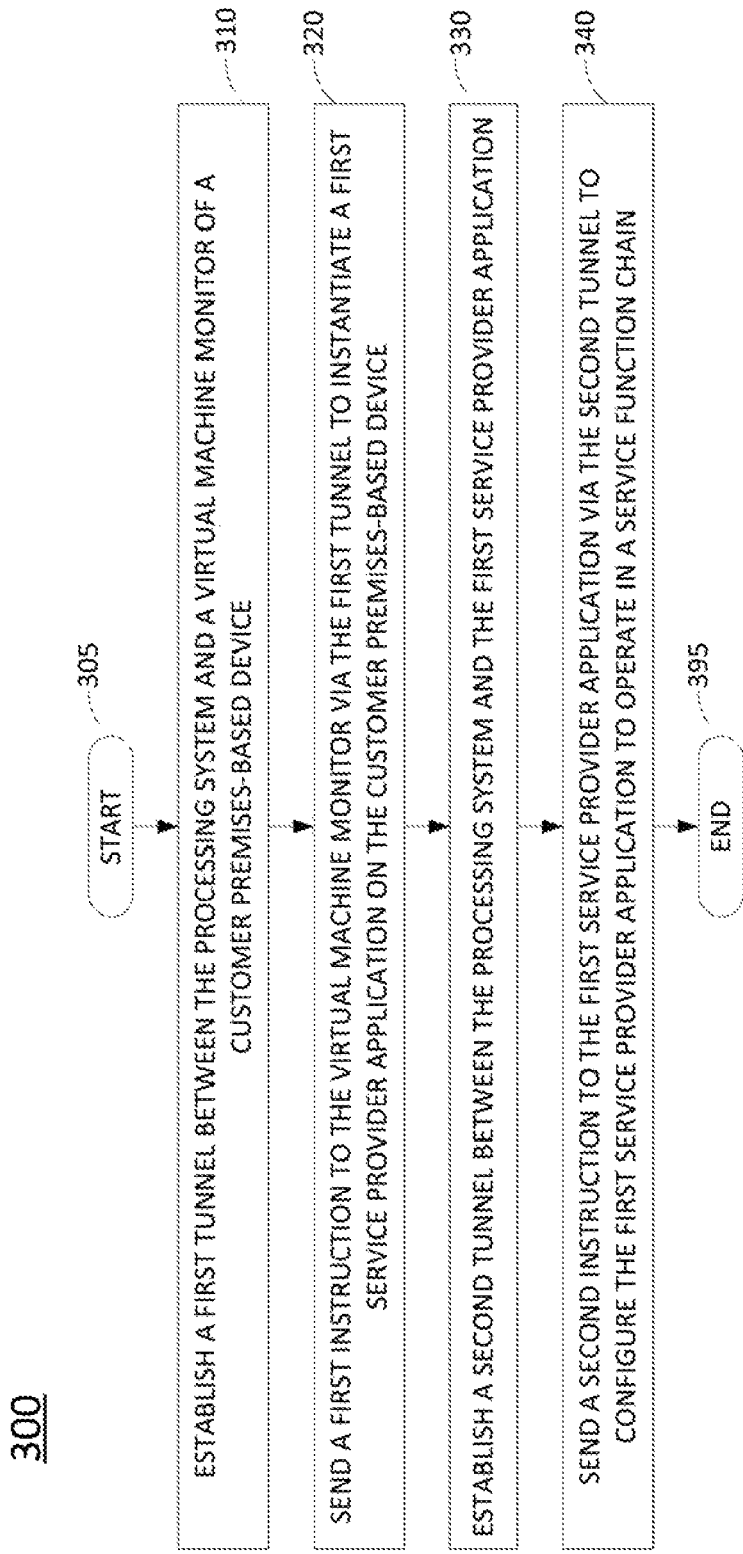
FIG. 3 illustrates a flowchart of an example method for instantiating a service provider application on a customer premises-based device.

FIG. 3 illustrates a flowchart of an example method 300 for instantiating a service provider application on a customer premises-based device, in accordance with the present disclosure. In one example, the method 300 is performed by an SDN controller deployed in a telecommunication network, or any one or more components thereof (e.g., one or more processors performing operations in accordance with instructions loaded into a memory), or by an SDN controller in conjunction with one or more other devices, such as an OSS, an application server, a host device, one or more remote servers, an SFC orchestrator, and so forth. In one example, the steps, functions, or operations of method 300 may be performed by a computing device or system 400, and/or a processing system 402 as described in connection with FIG. 4 below. For instance, the computing device 400 may represent at least a portion of an SDN controller, an OSS, an application server, a host, and so forth in accordance with the present disclosure. For illustrative purposes, the method 300 is described in greater detail below in connection with an example performed by a processing system, such as processing system 402. The method 300 begins in step 305 and proceeds to step 310.

At step 310, the processing system (e.g., of a telecommunication service provider network) establishes a first tunnel between the processing system and a virtual machine monitor (VMM) of a customer premises-based device, e.g., a host device. For example, the customer-premises based device may be operated by a customer of the telecommunication service provider network and deployed in a local network of the customer that is connected to or otherwise in communication with the telecommunication service provider network (e.g., via an access network operated by a same entity as the telecommunication service provider network or a different entity (e.g., a third-party access network)). In an example where the telecommunication service provider network and the customer premises device are connected via a third-party access network, the first tunnel may be established via the third-party access network. In one example, the VMM, or hypervisor, is operated by the customer and is controllable by the telecommunication service provider network. In another example, the VMM is operated by the telecommunication service provider network.

The first tunnel may comprise, for example, an application layer tunnel and/or a session layer tunnel (e.g., a session using Transport Layer Security (TLS), Generic Routing Encapsulation (GRE), IPSec, etc.), a link layer tunnel (e.g., a session using Layer 2 Tunneling Protocol (L2TP) or the like), a Multi-Protocol Label Switching (MPLS) tunnel, and so forth. The first tunnel may comprise a secure tunnel wherein all datagrams, packets, or other traffic that pass via the secure tunnel are encrypted using one or more encryption keys and/or encryption key pairs, e.g., using Diffie-Hellman key exchange or the like, such that only the processing system and the VMM may access the traffic. In one example, the VMM may be logically treated as a separate, standalone device from the perspective of the processing system. In other words, the processing system may share encryption keys, authentication keys, etc. with the VMM, whereas the underlying hardware device hosting the VMM partitions other logical entities on the hardware device with separate memory space, storage, and so forth such that the encryption keys and other information regarding the first tunnel is only available to the VMM and not to any host operating system, any guest operating systems or other hypervisors/VMMs, and so forth.

At step 320, the processing system sends a first instruction to the VMM via the first tunnel to instantiate a first service provider application on the customer premises-based device. For instance, in one example, the first tunnel carries first management traffic between the VMM of the customer premises-based device and the processing system of the telecommunication service provider network. For example, the processing system may comprise a software defined network (SDN) controller, where the first management traffic is between the SDN controller and the VMM. In other words, the first management traffic may include the first instruction to instantiate the first service provider application.

At step 330, the processing system establishes a second tunnel between the processing system and the first service provider application. In an example where the telecommunication service provider network and the customer premises-based device are connected via a third party access network, the second tunnel may also be established via the third-party access network. In one example, the second tunnel is between the processing system and at least one virtual network interface card (vNIC) of the first service provider application. In one example, the second tunnel carries signaling traffic and second management traffic between the first service provider application and the processing system of the telecommunication service provider network. In addition, in one example, the second tunnel further carries bearer plane traffic for the first service provider application.

The second tunnel may be of the same or a similar nature as the first tunnel described above, e.g., an application layer tunnel and/or a session layer tunnel using TLS, GRE, IPSec, etc., a link layer tunnel using LT2P or the like, an MPLS tunnel, and so forth. In one example, the first tunnel and the second tunnel may share a single application layer encryption. In another example, the first tunnel and the second tunnel may have separate encryption, but may also utilize an encryption technique of a third tunnel (e.g., a dual layer encryption scheme). In one example, a single session between the processing system and the host device (e.g., a third tunnel) may be shared among the signaling, management, and bearer traffic. However, in one example, management traffic may be separately measured in the telecommunication service provider network and not charged to the customer.

At step 340, the processing system sends a second instruction to the first service provider application via the second tunnel to configure the first service provider application to operate in a service function chain (SFC). For example, the processing system may comprise a SDN controller, where the first management traffic is between the SDN controller and the VMM and where the second management traffic is between the SDN controller and the first service provider application. In other words, the second management traffic may include the second instruction to configure the first service provider application. Alternatively, or in addition, the processing system may comprise an operations support system (OSS). In such an example, the first management traffic may be between the OSS and the VMM, and the second management traffic may be between the OSS and the first service provider application. In addition, in one example the signaling traffic may be between the OSS and the first service provider application.

In one example, at least one customer application is also instantiated on the customer premises-based device via the VMM. In addition, in such an example, the SFC may include the at least one customer application and the first service provider application. Alternatively, or in addition, the SFC may include at least a second service provider application. For example, the at least second service provider application may be instantiated (and/or hosted) on the customer premises-based device via the VMM or may be instantiated (and/or hosted) on at least one device in the telecommunication service provider network. It should also be noted that the first service provider application can be configured to operate in more than one SFC involving customer applications and/or service provider applications in the customer network, the telecommunication service provider network, other networks connected to or in communication with the customer network and/or the telecommunication service provider network (e.g., an SD-WAN), and so forth. Following step 340, the method 300 proceeds to step 395 where the method ends.

It should be noted that the method 300 may be expanded to include additional steps or may be modified to include additional operations with respect to the steps outlined above. For example, the method 300 may be expanded to include repeating the steps 320-340 through multiple iterations, e.g., to establish additional service provider applications on the customer premises-based device, to configure the additional service provider applications into service function chains, etc. In another example, the method 300 may be expanded to include decommissioning the service provider application. In still another example, the method 300 may be expanded to include reconfiguring the service provider application in terms of performance within the current service function chain or to cause the service provider application to operate in a different service function chain. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method can be omitted, combined, separated, and/or performed in a different order from that described above, without departing from the example embodiments of the present disclosure. For instance, any one or more steps of the above recited method 300 may comprise optional steps in various additional examples.

Figure 4:
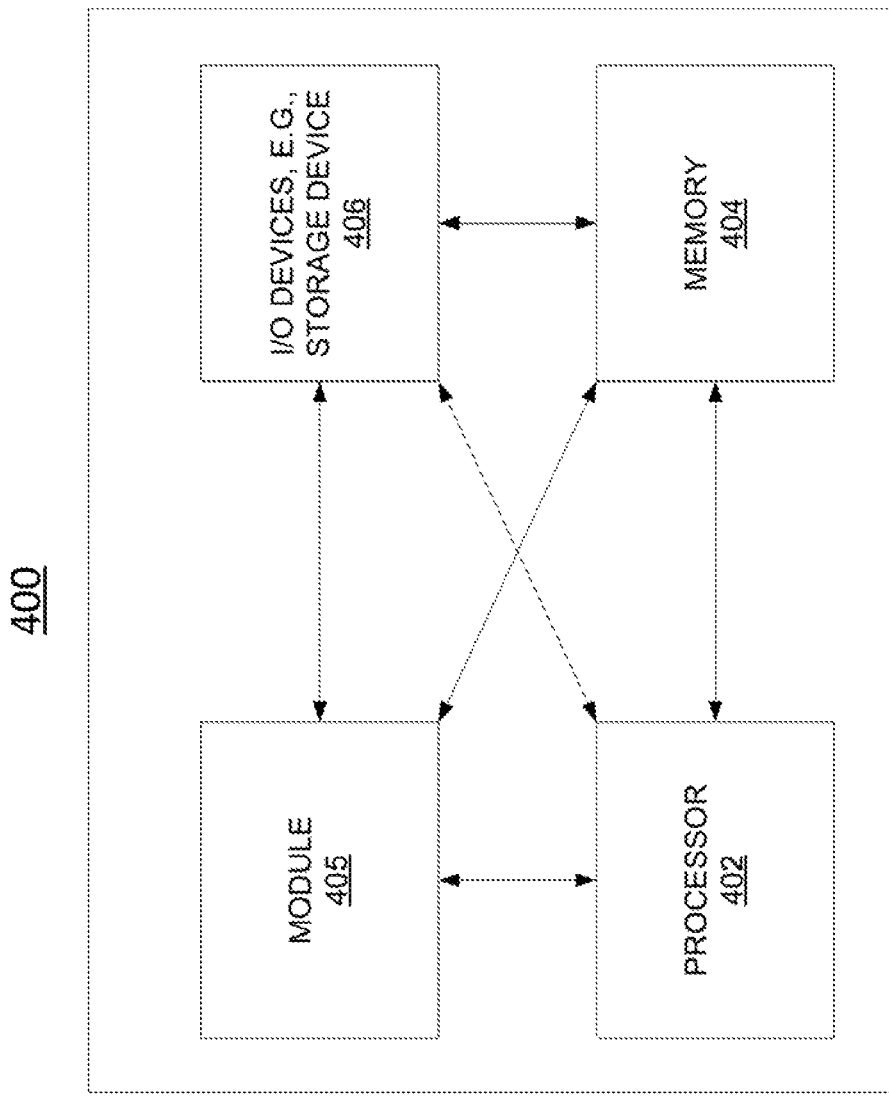
FIG. 4 illustrates a high level block diagram of a computing device specifically programmed to perform the steps, functions, blocks and/or operations described herein.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for instantiating a service provider application on a customer premises-based device, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method(s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for instantiating a service provider application on a customer premises-based device (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for instantiating a service provider application on a customer premises-based device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    establishing, by a processing system of a telecommunication service provider network including at least one processor, a first tunnel between the processing system and a virtual machine monitor of a customer premises-based device;
    sending, by the processing system, a first instruction to the virtual machine monitor via the first tunnel, the first instruction for directing the virtual machine monitor to instantiate a first service provider application on the customer premises-based device;
    establishing, by the processing system, a second tunnel between the processing system and the first service provider application, wherein the first service provider application is configured to operate in a service function chain; and
    sending, by the processing system, a second instruction to the virtual machine monitor via the first tunnel to tear down the first service provider application from the service function chain.

2. The method of claim 1, wherein the customer premises-based device is operated by a customer of the telecommunication service provider network.

3. The method of claim 1, wherein the virtual machine monitor is operated by a customer and is controllable by the telecommunication service provider network.

4. The method of claim 1, wherein the virtual machine monitor is operated by the telecommunication service provider network.

5. The method of claim 1, wherein the telecommunication service provider network and the customer premises-based device are connected via a third party access network.

6. The method of claim 5, wherein the first tunnel and the second tunnel are established via the third party access network.

7. The method of claim 1, wherein at least one customer application is instantiated on the customer premises-based device via the virtual machine monitor.

8. The method of claim 7, wherein the service function chain includes the at least one customer application and the first service provider application.

9. The method of claim 1, wherein the service function chain includes at least a second service provider application.

10. The method of claim 9, wherein the at least the second service provider application is instantiated on the customer premises-based device via the virtual machine monitor or is instantiated on at least one device in the telecommunication service provider network.

11. The method of claim 1, wherein the first tunnel carries first management traffic between the virtual machine monitor of the customer premises- based device and the processing system of the telecommunication service provider network.

12. The method of claim 11, wherein the second tunnel carries signaling traffic and second management traffic between the first service provider application and the processing system of the telecommunication service provider network.

13. The method of claim 12, wherein the second tunnel further carries bearer plane traffic for the first service provider application.

14. The method of claim 12, wherein the processing system comprises a software defined network controller, wherein the first management traffic is between the software defined network controller and the virtual machine monitor, and wherein the second management traffic is between the software defined network controller and the first service provider application.

15. The method of claim 12, wherein the processing system comprises an operations support system.

16. The method of claim 15, wherein the first management traffic is between the operations support system and the virtual machine monitor, and wherein the second management traffic is between the operations support system and the first service provider application.

17. The method of claim 15, wherein the signaling traffic is between the operations support system and the first service provider application.

18. A non-transitory computer-readable medium storing instructions which, when executed by a processing system of a telecommunication service provider network including at least one processor, cause the processing system to perform operations, the operations comprising:
    establishing a first tunnel between the processing system and a virtual machine monitor of a customer premises-based device;
    sending a first instruction to the virtual machine monitor via the first tunnel, the first instruction for directing the virtual machine monitor to instantiate a first service provider application on the customer premises-based device;
    establishing a second tunnel between the processing system and the first service provider application, wherein the first service provider application is configured to operate in a service function chain; and
    sending a second instruction to the virtual machine monitor via the first tunnel to tear down the first service provider application from the service function chain.

19. The non-transitory computer-readable medium of claim 18, wherein the customer premises-based device is operated by a customer of the telecommunication service provider network.

20. A device comprising:
    a processing system of a telecommunication service provider network including at least one processor; and
    a computer-readable medium storing instructions which, when executed by the processing system, cause the processing system to perform operations, the operations comprising:
        establishing a first tunnel between the processing system and a virtual machine monitor of a customer premises-based device;
        sending a first instruction to the virtual machine monitor via the first tunnel, the first instruction for directing the virtual machine monitor to instantiate a first service provider application on the customer premises-based device;
        establishing a second tunnel between the processing system and the first service provider application, wherein the first service provider application is configured to operate in a service function chain; and sending a second instruction to the virtual machine monitor via the first tunnel to tear down the first service provider application from the service function chain.

* * * * *